(12) United States Patent
Dingler

(10) Patent No.: US 10,550,589 B2
(45) Date of Patent: Feb. 4, 2020

(54) HINGED CONCRETE FORM

(71) Applicant: MEVA SCHALUNGS-SYSTEME GMBH, Haiterbach (DE)

(72) Inventor: Florian F. Dingler, Haiterbach (DE)

(73) Assignee: MEVA SCHALUNGS-SYSTEME GMBH, Haiterbach (DE)

( * ) Notice: Subject to any disclaimer, the term of this patent is extended or adjusted under 35 U.S.C. 154(b) by 0 days.

(21) Appl. No.: 15/641,832

(22) Filed: Jul. 5, 2017

(65) Prior Publication Data

US 2018/0010347 A1 Jan. 11, 2018

Related U.S. Application Data

(60) Provisional application No. 62/358,178, filed on Jul. 5, 2016.

(51) Int. Cl.
*E04G 9/08* (2006.01)
*B28B 7/04* (2006.01)
*E05D 3/02* (2006.01)

(52) U.S. Cl.
CPC ............... *E04G 9/083* (2013.01); *B28B 7/04* (2013.01); *E05D 3/02* (2013.01)

(58) Field of Classification Search
CPC ........... Y10T 16/5595; Y10T 16/55963; Y10T 16/55988; B28B 7/04; E05D 3/02; E04G 9/083
USPC ...... 16/389, 390, 392; 249/44, 47, 194, 159; 52/71; 14/69.5, 71.1
See application file for complete search history.

(56) References Cited

U.S. PATENT DOCUMENTS

| | | | | |
|---|---|---|---|---|
| 508,983 A * | 11/1893 | Rost | ........................... | E05D 3/02 16/392 |
| 953,383 A * | 3/1910 | Holman | ................... | E04G 11/18 249/180 |
| 1,078,363 A * | 11/1913 | Lisicke | .................... | E05D 11/06 16/374 |
| 1,153,447 A * | 9/1915 | Roughsedge | ........... | E04G 11/02 249/180 |
| 1,186,288 A * | 6/1916 | Cunningham | ............ | E05D 3/02 16/390 |
| 1,329,059 A * | 1/1920 | Nickol | ....................... | E05D 3/02 16/392 |
| 1,736,376 A * | 11/1929 | Showers | ............... | E04G 17/001 249/194 |
| 2,372,977 A * | 4/1945 | North | ...................... | E05D 5/065 16/389 |
| 2,973,547 A * | 3/1961 | Heyer | ..................... | E05D 5/065 16/252 |
| 3,006,039 A * | 10/1961 | Brydolf | ..................... | E05D 5/06 16/379 |
| 3,185,433 A * | 5/1965 | Mueller | ................... | E04G 11/12 24/329 |
| 3,357,673 A * | 12/1967 | Williams | .................. | E04G 9/08 249/194 |

(Continued)

*Primary Examiner* — Michael Safavi
(74) *Attorney, Agent, or Firm* — Black, McCuskey, Souers & Arbaugh, LPA

(57) ABSTRACT

A hinged corner for a construction form includes a first flange connected to a first mounting plate for a form member and a second flange connected to a second mounting plate for a form member. The first flange and the second flange pivot relative to one another in an overlapping relationship about a pivot point disposed between the first mounting plate and the second mounting plate.

2 Claims, 4 Drawing Sheets

(56) References Cited

U.S. PATENT DOCUMENTS

| | | | | |
|---|---|---|---|---|
| 3,423,898 A * | 1/1969 | Coloney | E04B 1/2608 | 403/4 |
| 3,469,276 A * | 9/1969 | Dickson | E05D 7/081 | 16/235 |
| 3,506,326 A * | 4/1970 | Tantillo | A47B 67/02 | 16/389 |
| 3,507,473 A * | 4/1970 | Blonde | E04G 11/02 | 249/171 |
| 3,676,975 A * | 7/1972 | Belluscio | E04B 1/162 | 249/195 |
| 3,729,111 A * | 4/1973 | Farnsworth | B65D 9/14 | 16/221 |
| 3,825,220 A * | 7/1974 | Schmaltz | E04G 9/04 | 249/194 |
| 3,874,543 A * | 4/1975 | Farnsworth | B65D 9/14 | 217/16 |
| 3,917,216 A * | 11/1975 | Plough | E04G 13/02 | 249/194 |
| 4,148,164 A * | 4/1979 | Humphrey | E04D 13/158 | 52/105 |
| 4,161,850 A * | 7/1979 | Peterson | E04B 2/82 | 16/379 |
| 4,332,055 A * | 6/1982 | Rudnick | E05D 11/1042 | 16/335 |
| 4,443,905 A * | 4/1984 | Kopp | B65G 69/30 | 14/69.5 |
| 4,726,155 A * | 2/1988 | Nahmias | E04B 1/344 | 52/71 |
| 4,958,800 A * | 9/1990 | Carlson | E04G 13/02 | 16/223 |
| 4,969,626 A * | 11/1990 | Strauch | B28B 7/04 | 249/11 |
| 5,788,874 A * | 8/1998 | Tucker, Jr. | B28B 7/0011 | 16/221 |
| 8,850,774 B2 * | 10/2014 | Kempf | B66C 3/00 | 52/640 |
| 2002/0104191 A1* | 8/2002 | Matteau | E05D 3/18 | 16/255 |
| 2004/0056172 A1* | 3/2004 | Sedran | E04G 9/05 | 249/189 |
| 2007/0234491 A1* | 10/2007 | Bailie | B65G 69/30 | 14/69.5 |
| 2009/0300859 A1* | 12/2009 | Lucht | B65G 69/30 | 14/69.5 |

* cited by examiner

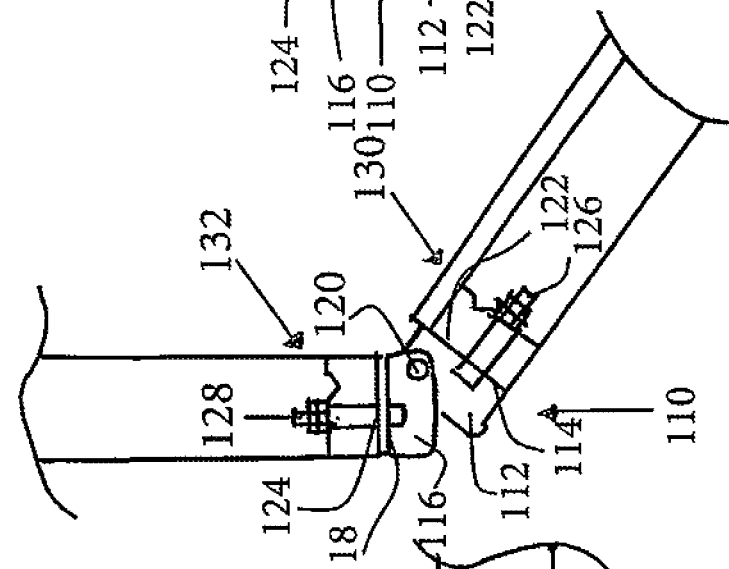
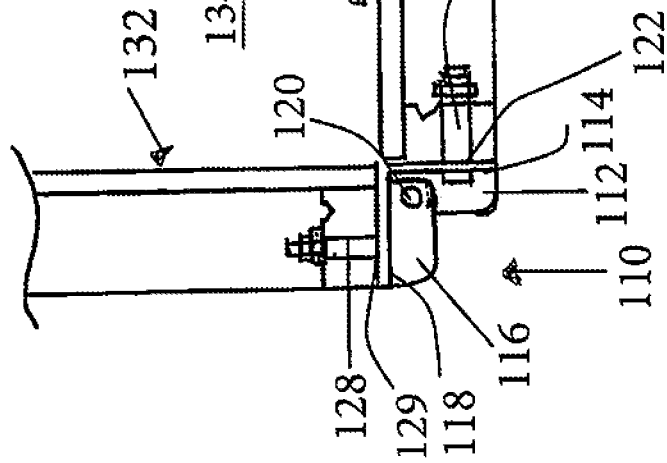

HINGED CONCRETE FORM

CROSS-REFERENCE TO RELATED APPLICATIONS

This application claims priority to and the benefit of U.S. Provisional Patent Application No. 62/358,178, filed 5 Jul. 2016, the contents of which are hereby incorporated by reference in their entirety.

BACKGROUND

This relates in general to construction forms. Construction forms are typically used to provide temporary structure in the building trades. For example, construction forms are often used to give structure to an uncured material, such a concrete, when first positioned, and then removed once the material has reached a sufficiently stable state.

SUMMARY

This relates more particularly to a hinged corner for a construction form.

A hinged corner for a construction form includes a first flange connected to a first mounting plate for a form member and a second flange connected to a second mounting plate for a form member. The first flange and the second flange pivot relative to one another in an overlapping relationship about a pivot point disposed between the first mounting plate and the second mounting plate.

The hinged corner may be a zero degree corner.

The first flange and the second flange may overlap about the pivot point in a closed position. The first flange and the second flange may overlap along the length of the first flange and the second flange between the first mounting plate and the second mounting plate when in the fully open position.

The first mounting plate and the second mounting plate may each include a bolt aperture to receive a bolt for securement to a respective member of a form system. The respective members may be form panels. The hinged corner may cooperate with the form panels to form a clamp system. When in a closed position the hinged corner may be full disposed outside of an interior defined by the respective members. The hinged corner and the respective members may form a portion of a construction form without any ties. The respective members may be sized to a desired finished dimension of a material to be placed in an interior defined by the respective members.

The hinged corner may function as a cam-lock

Various aspects will become apparent to those skilled in the art from the following detailed description and the accompanying drawings.

BRIEF DESCRIPTION OF THE DRAWINGS

FIG. 4 is a top view of the hinged corner and the first and second panels of FIG. 2 in a closed position.

FIG. 5 is a top view of the hinged corner and the first and second panels of FIG. 2 in a partially open position.

FIG. 6 is a top view of the hinged corner and the first and second panels of FIG. 2 in a fully opened position.

DETAILED DESCRIPTION

Figure 1:
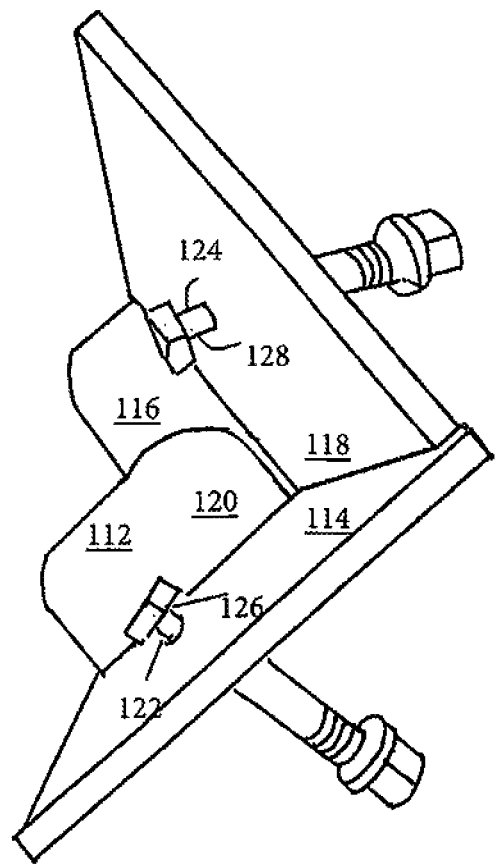
FIG. 1 is a photographic view of hinged corner for a construction form.
Figure 2:
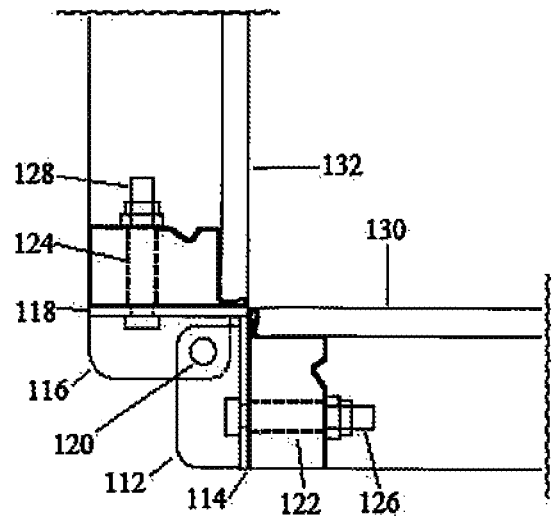
FIG. 2 is a top view of the hinged corner of FIG. 1 with first and second panels.
Figure 3:
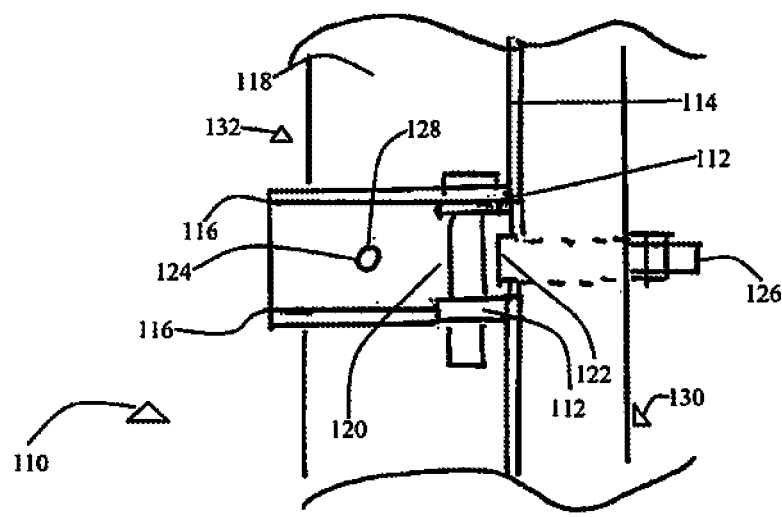
FIG. 3 is a side view of the hinged corner and the first and second panels of FIG. 2.

Referring now to the drawings, there is illustrated in FIGS. 1-3 a hinged corner 110 for a construction form. The hinged corner includes a first flange 112 connected to a first mounting plate 114, two are shown. The hinged corner also includes a second flange 116 connected to a second mounting plate 118, two are shown. The flanges 112 and 116 may be connected to the plates 114 and 118 by welding, for example, or any other suitable method of joiner able to withstand the pressures and stresses in use a member of a construction form.

The first flange 112 and the second flange 116 pivot relative to one another in an overlapping relationship about a pivot point 120 disposed between the first mounting plate 114 and the second mounting plate 118. The hinged corner 110 may be zero degree corner hinge.

In operation of at least one embodiment, the first flange 112 and the second flange 116 overlap about the pivot point in a closed position, as shown in FIG. 4.

In operation of at least one embodiment, the first flange 112 and the second flange 116 overlap along the length of the first flange 112 and the second flange 116 between the first mounting plate 114 and the second mounting plate 118 when in a fully open position, as shown in FIG. 6.

Preferably, each of the first mounting plate 114 and the second mounting plate 118 include a bolt aperture 122, 124 to receive a bolt 126, 128 for securement to a respective member 130, 132 of a form system.

Figure 7:
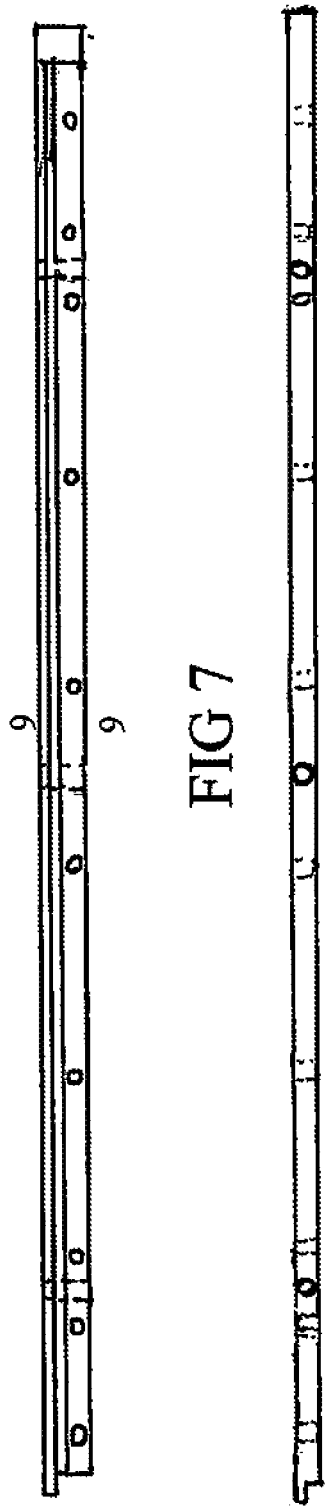
FIG. 7 is a side view of a frame member of one of the panels of FIG. 2.
Figure 8:
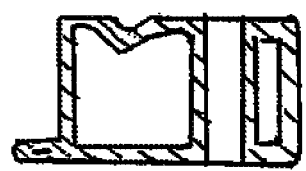
FIG. 8 is an edge view of the frame member of FIG. 7.
Figure 9:
FIG. 9 is an end view of the frame member of FIG. 7.

In the illustrated example, the respective members 130 and 132 are form panels, although such is not required, see FIGS. 7-9. In such an arrangement, the hinged corner 110 may cooperate with the form panels 130 and 132 to form a clamp system.

In at least one embodiment, the hinged corner 110 is full disposed outside of an interior 134, see FIG. 4, defined by the respective members 130 and 132 when in a closed position.

In at least one embodiment, the hinged corner 110 and the respective members 130 and 132 form at least a portion of a construction form without any ties.

In at least one embodiment, the respective members 130 and 132 are sized to a finished dimension of a material to be placed in an interior defined by the respective members.

In at least one embodiment, the hinged corner 110 functions as a cam-lock.

In at least one implementation, the hinged corner 110 is integrated with other formwork elements, such as known standard formwork elements. The hinged corner 110 may be mounted together with these other formwork elements, for example, in the case of a four sided column, four hinged corners 110 and four formwork elements may be joined together to form a four sided column formwork. It must be understood that such an assembly may have any number of sides as desired. For further example, two opposing formwork elements with 1 ft. width, and two opposing formwork elements with 2 ft. width may be used to form a four sided column that will have a cross section of 1×2 sq. ft. The width of the opposing formwork elements may be chosen as desired and thereby it is possible to get a variety of rectangular or quadratic cross sections of columns with standard elements. It must be understood that other cross sectional shapes may be attained by choosing a number of sides and configuring them in a desired pattern and including the appropriate number of hinged corners 110 and setting them in angles as desired.

In any case, in at least one implementation of the hinged corner 110 results in an easy dismantling of a formwork after completing of a process, such as hardening of poured concrete. In operation, a connection of one of the hinged corners 110 at one edge of a formwork, such as a column formwork, may be untightened and the formwork may be opened by pivotable movement of other hinged corners 110 forming corner elements of the formwork.

While principles and modes of operation have been explained and illustrated with regard to particular embodiments, it must be understood, however, that this may be practiced otherwise than as specifically explained and illustrated without departing from its spirit or scope.

What is claimed is:

1. A formwork system comprising:
   a hinged corner including:
      a first flange connected to a first mounting plate including a bolt aperture; and
      a second flange connected to a second mounting plate including a bolt aperture; and
   a first formwork element, which is a first form panel, connected to the first mounting plate and secured with a first bolt received through the bolt aperture of the first mounting plate; and
   a second formwork element, which is a second form panel, connected to the second mounting plate and secured with a second bolt received through the bolt aperture of the second mounting plate;
   where the first flange and the second flange are pivotable relative to one another in an overlapping relationship about a pivot point disposed between the first mounting plate and the second mounting plate to pivot the formwork element about the pivot point;
   where the first flange and the second flange overlap about the pivot point in a closed position;
   where when in the closed position the hinged corner is fully disposed outside of an interior defined at least in part by the first and second formwork elements,
   where the first flange and the second flange overlap along a length of the first flange and the second flange between the first mounting plate and the second mounting plate when in an open position,
   where the hinged corner and the first and second formwork elements form a portion of the construction form without any ties, and
   where the formwork elements are sized to a finished dimension of a material to be placed in the interior defined at least in part by the first and second formwork elements, and
   where the hinged corner is exposed to the interior area when the hinged corner is in the open position.

2. The formwork system of claim 1 where the hinged corner is a first hinged corner, the formwork system further comprising a second hinged corner connected to the first formwork element opposite the first hinged corner, the second hinged corner also including:
   a first flange connected to a first mounting plate; and
   a second flange connected to a second mounting.

* * * * *